United States Patent

[11] 3,545,350

| [72] | Inventor | Thomas A. O. Gross<br>Lincoln, Massachusetts |
|---|---|---|
| [21] | Appl. No. | 725,882 |
| [22] | Filed | May 1, 1968 |
| [45] | Patented | Dec. 8, 1970 |
| [73] | Assignee | Polaroid Corporation<br>Cambridge, Massachusetts<br>a corporation of Delaware |

[54] EXPOSURE CONTROL SYSTEM FOR PHOTOGRAPHIC APPARATUS
16 Claims, 3 Drawing Figs.

[52] U.S. Cl. ........................................................ 95/10, 250/209
[51] Int. Cl. ...................................................... G03b 7/08, G01j 1/44
[50] Field of Search .......................................... 95/10(C), 53; 250/209, 213

[56] References Cited
UNITED STATES PATENTS
3,310,679 3/1967 Babish .......................... 95/10(C)UX
3,326,103 6/1967 Topaz ............................ 95/10(C)

*Primary Examiner*—John M. Horan
*Assistant Examiner*—Joseph F. Peters, Jr.
*Attorneys*—Brown and Mikulka, William D. Roberson and Gerald L. Smith ABSTRACT: A photographic exposure control system using a plurality of photoconductive devices, each of which gauges light intensity over a portion of the scene being photographed. The system selects the output signal of that photoconductor representing an extreme of light intensity. This selected signal is then incorporated within the exposure value adjustment mechanism of a camera. The system may be switched to select the output of the photoconductor receiving the least intensity of illumination or that receiving the highest intensity of illumination.

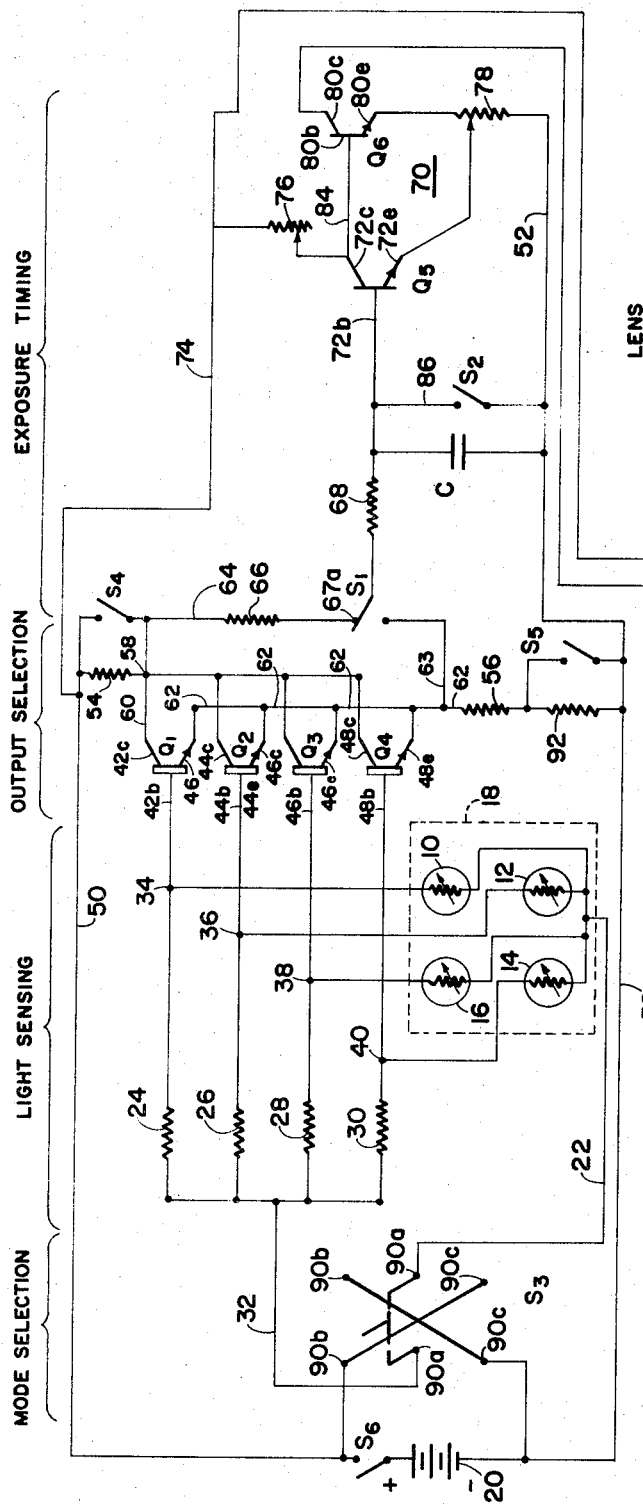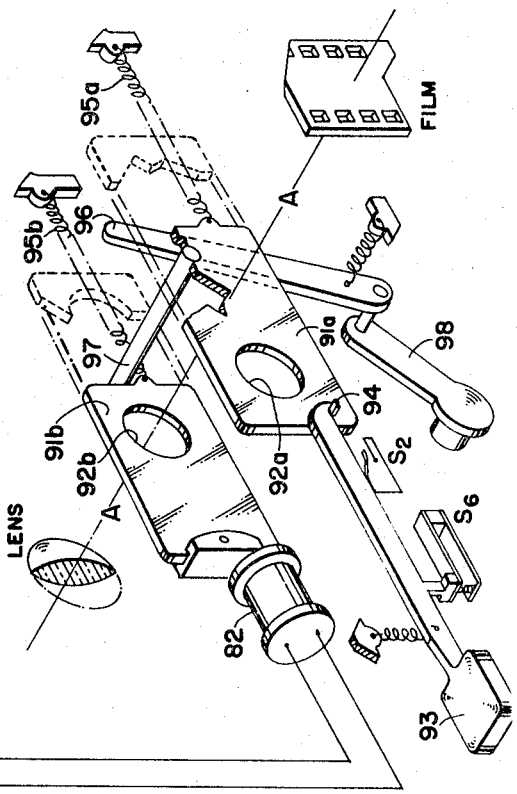
FIG. I
INVENTOR.
Thomas A. O. Gross
BY
Brown and Mikulka
and
Gerald L. Smith
ATTORNEYS

EXPOSURE CONTROL SYSTEM FOR PHOTOGRAPHIC APPARATUS

BACKGROUND OF THE INVENTION

Over the relatively recent past, the photographic industry has evolved a variety of automated exposure systems for cameras and the like. These systems generally are structured so as to perform an initial measurement of scene brightness from which measurement a signal is formed. This light representative signal is then translated into a corresponding exposure value to which a camera adjustment mechanism is conformed. Such exposure value settings may take a variety of forms depending upon the design and complexity of the camera structure as well as that of any type of artificial illumination which may be used. For instance, in one popular automated exposure control arrangement, a signal derived as representing total scene brightness is integrated to evolve a timed input for use in establishing the exposure interval for a shutter mechanism.

As is apparent, the degree of accuracy and reliability of the brightness or light intensity measuring function of the automated devices may establish the limits of accuracy for the entire exposure system. In general practice, the light measuring circuits utilize a photosensitive element which is positioned upon the housing of a camera. This element is alined in a manner such that it is responsive to the overall light characteristics of a scene somewhat coincident with that of the field of view of the camera lens system.

The designs for automated exposure value adjustment circuits usually call for light-sensing elements of the photoconductive variety. Fabricated from materials among which are selenium, cadmium sulfide, lead sulfide and the like, the photosensitive elements are characterized in having electrical conductivities varying reproduceably with the intensity of light impinging upon them. The signals derived from circuits incorporating the photoconductive elements represent a value of light intensity or brightness integrated over the entire scene which they witness. This integrated value of light is then a basis of measurement from which an exposure value is derived.

Experience with the use of such integrated light valuations for an entire scene has suggested that further refinements are warranted. For instance, in many photographic situations, the illumination of a scene will vary considerably from one portion to another. Exposure values which have been gaged for such scenes only with regard to an integrated quantity of the entire scene light may not be adequately representative for photographic purposes. Consequently, a form of correction is necessitated. The character of correction required, however, will be seen to differ with respect to the type of scene illumination provided.

When photographing under ambient illumination, scenes may be encountered wherein there exist proportionately small areas or components which are relatively bright with respect to the remaining areas of the scene. Such a small area of dominant light intensity often will influence an integrated valuation of entire scene light so as to cause the camera exposure mechanism to respond inaccurately. Generally, the exposure value so selected by the mechanism will produce an underexposure of details within the less dominantly illuminated portions of the scene. In a predominant number of photographic situations, this result is undesirable.

When photographing under artificial illumination, such as with flash units and the like, subjects may be encountered representing relatively small objects against a background of low illumination. At the ranges generally encountered in flash photography, the dark background exerts excessive influence on the integrated valuation of entire scene light. As a result, the valuation will produce an exposure value permitting an overexposure of subjects of principal interest within the scene. In a predominant number of flash photographic situations, this result will be undesirable.

To accommodate each of the above situations, recourse may be made to the use of a plurality of light intensity measurements. Each of these measurements is made over an exclusive portion of the scene being photographed. A plurality of alined photoconductors may be mounted with the camera to provide a selection of analog signals representing the light values of appropriate portions of the scene. For use with automated exposure control systems, it is desirable that the control system select the analog signal best suited for use with the lighting situation at hand. More particularly, the control system should utilize the signal representing least scene brightness where ambient illumination is utilized. Conversely, the control system should be configured to utilize the signal representing maximum scene brightness in photographic situations where artificial illumination is utilized.

To accomplish the foregoing, there exists a need for an exposure control system which initially will derive a plurality of signals, each representing an analog of integrated light intensity. The system should be capable of recognizing, selecting, and utilizing that signal representing an extreme of light intensity. Additionally, the system preferably should be adaptable to use alternately with both ambient and artificial illumination.

SUMMARY OF THE INVENTION

The invention now presented provides a photographic exposure control system incorporating a plurality of photosensitive elements. Each of these elements function to derive a photometric measurement made over a select portion of the scene being photographed. The lighting evaluations thusly derived are scrutinized by the circuitry of the invention in a manner providing for the selection and use of a value representing an extreme of the measurements made.

In effecting this unique scrutinization and selection procedure, the control system of the invention provides a sensing network formed having a plurality of branches, each responsive to the intensity of illumination at a select portion of the scene being photographed. Each of the light-sensing branches is formed having at least one photoconductive element responsive to such scene light arranged in series with a resistor means. From each junction between the photoconductive elements and resistor means there are evolved output potentials, each representing an analog of a select portion of scene light intensity.

Through the incorporation of discrete unilaterally conductive means with the analog light measuring outputs, a logic arrangement is derived which advantageously functions to isolate that branch output representing an extreme of scene illumination.

The invention is further characterized in the provision of a simple and straightforward switching arrangement for selecting either an output appropriate for gaging ambient illumination or an output appropriate for use with flash photography.

As another feature of the invention, whether operating for use with either flash or ambient illumination, the output selected by the logic arrangement of the system will always be from that light-sensing branch having a potential of highest magnitude.

In one aspect of the invention, transistor means are utilized as the unilaterally conductive means of the logic arrangement. Through the use of a back biasing circuitry interconnecting the transistors, the logic arrangement functions to select and isolate any branch output potential of highest magnitude.

In addition to the foregoing, the objects of the invention include the provision of an exposure control system adapted to derive an exposure value responsive to the darker portions of an ambiently illuminated scene and, conversely, to derive an exposure value responsive to the more reflective portions of an artificially illuminated scene.

Other objects of the invention will in part be obvious and will in part appear hereinafter.

The invention, accordingly, comprises the apparatus and method possessing the features, techniques and properties which are exemplified in the description to follow hereinafter.

For a fuller understanding of the nature and objects of the invention, reference should be had to the following detailed description taken in connection with the accompanying drawings.

BRIEF DESCRIPTION OF THE DRAWINGS

FIG. 1 is a schematic electrical diagram of a control system according to the present invention;

DETAILED DESCRIPTION OF THE DRAWINGS

Figure 2:
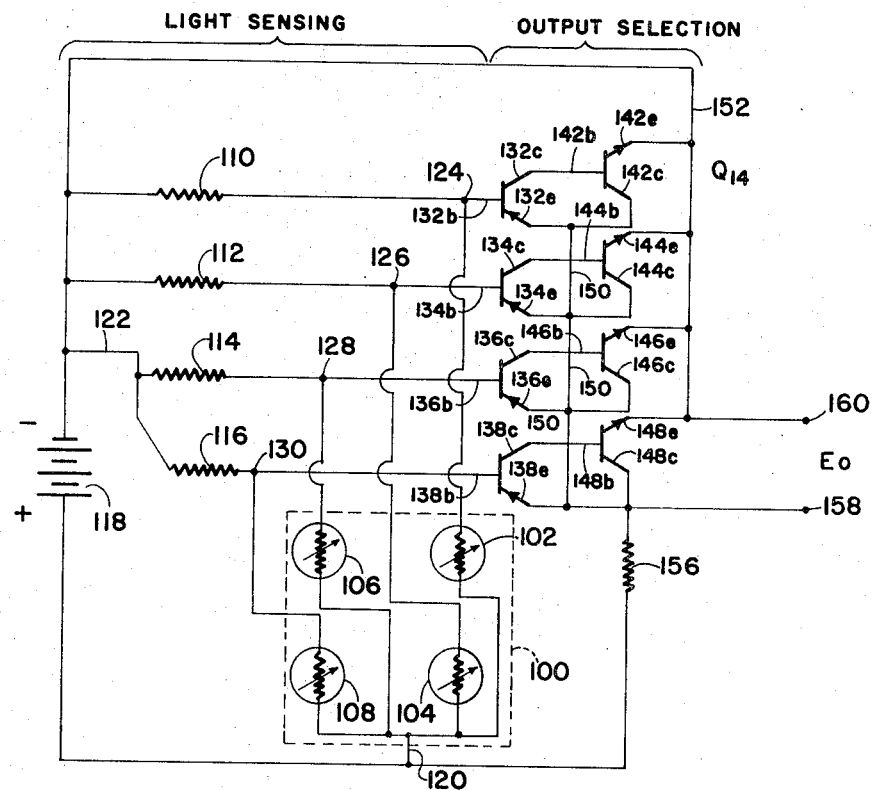
FIG. 2 is a schematic electrical diagram of an alternate embodiment of the light-sensing and selection function of the system of the invention.

The exposure control system of the invention functions to make a plurality of photometric evaluations of a scene. From these evaluations, one is selected representing an extreme of brightness or reflectivity. The selection of which extreme is dependent upon the mode of scene illumination used. Should ambient illumination be relied upon, the system will select that evaluation representing a measurement of the darker portions of the photographed scene. On the other hand, should artificial illumination, as from a flash unit, be utilized, the control system will select that evaluation representing a portion of the scene having the highest reflectivity.

Referring to FIG. 1, an embodiment of the control system is depicted. Component groupings forming the primary functions of the system are delimited in the drawing by labels. The general functions are seen to include a "mode selection" function for selectively switching between ambient or artificially illuminated measurement; a "light-sensing" function for making photometric measurements over select portions of a scene; an "output selection" function for selecting an appropriate light evaluation from the light sensing function; an "exposure timing" circuitry for deriving an appropriate photographic exposure value; and a schematic shutter and lens system. For illustrative purposes, the switching within the system is shown adjusted for use in photographing under ambient illumination.

Turning initially to the light-sensing function, four photoconductors or light dependent resistors 10, 12, 14, and 16 are shown grouped at 18. The grouping of photoconductors 18 is mounted at a convenient location upon the housing of a camera. Each of the photoconductors within the grouping is alined with the field of view of the camera lens system so as to respond to the brightness or reflective characteristics of select portions of the scene encompassed by that field of view. It will be apparent that any number and arrangement of photoconductors may be used with the instant system depending upon the number of discrete photometric scene evaluations desired.

The photoconductors 10—16 are of the variety whose conductivities increase as they are exposed to increasing amounts of light and are shown connected with the potential of battery power source 20 from lead 22. Each of the photoconductors 10—16 respectively form one leg of a corresponding branch of the light-sensing network. The remaining leg of each branch is formed respectively of resistors 24, 26, 28 and 30, all of which have equal values of resistance. This value of resistance is preferably of an order of magnitude comparable to that of the photoconductors at medium light intensities. The resistors 24—30 are connected into the opposite terminal of battery 20 from along line 32. A voltage dividing arrangement for each branch is effected from junctions shown respectively at 34, 36, 38, and 40. The voltages present at these junctions will be seen to represent the light value measurements of each branch. When operating within an ambient mode of illumination, as the amount of light impinging upon any one photocell diminishes, its resistance will rise and the resultant voltage at its branch junction or pickoff will correspondingly increase. Accordingly, the light-sensing branch measuring the darker portion of a scene will derive the comparatively highest terminal voltage. Ultimately, this output will be used in adjusting to an exposure value at the exposure timing function.

Turning to the output selection function of the circuitry, there is illustrated a grouping of identical NPN transistors $Q_1$, $Q_2$, $Q_3$, and $Q_4$, which are interconnected to form a voltage sensitive selection circuit. In the circuit, the base 42b, 44b, 46b, and 48b, of each transistor is connected respectively with a light-sensing branch junction 34, 36, 38, and 40. The selection circuit is further arranged such that the collectors 42c, 44c, 46c, and 48c of each transistor are interconnected. Similarly, the emitter electrodes 42e, 44e, 46e, and 48e of each transistor are mutually interconnected. Each of the transistors $Q_1$ through $Q_4$ will conduct in proportion to the value of the gating voltage applied to its base electrode from a light-sensing branch junction. The selective characteristic of the circuit is realized by virtue of the above-noted interconnection of all emitter electrodes and all collector electrodes. Thusly interconnected, that transistor having the highest transmitting value or forward bias will function to back bias the remaining transistors. For example, assuming that the highest potential developed in the light-sensing branches is present at junction 34, transistor $Q_1$ will be forward biased from base electrode 42b to provide a transmitting value across its collector 42c and emitter 42e. The degree of conduction at $Q_1$ will be higher than that at transistors $Q_2$, $Q_3$, and $Q_4$. Accordingly, the potential present at the interconnected emitters 42e, 44e, 46e, and 48e will be that established at the emitter 42e of transistor $Q_1$. As a result, transistors $Q_2$ through $Q_4$ are back biased and their outputs are isolated from the control system. Power supplied across the output selection function is derived at battery source 20 from along lines 50 and 52. A load resistor 54 is inserted at the input to the selector circuit for the purpose of adjusting the input to the operating range of the bank of transistors. Similarly, a resistor 56 is positioned on the opposite side of the transistor bank. The resistance provided at 56 functions to heighten the sensitivity of transistors $Q_1$ through $Q_4$ to a back biased state. Its value is usually selected as about one-half that of resistor 54.

The techniques for converting a thusly selected light-metering signal into an exposure value setting for a camera may vary widely. For the present example, the selected output of the light-sensing network is used in conjunction with an R-C timing circuit serving to adjust an exposure interval. A more detailed description of this form of an exposure timing arrangement may be found in U.S. Pat. No. 3,205,798 issued Sept. 14, 1965, under the inventorship of C.H. Biber and assigned to the common assignee. The R-C circuit is activated in response to a current level which is adjusted, in turn, by the selected output of the light-sensing network.

Assuming, as before, that $Q_1$ only is conducting in response to a dark level light measurement at photoconductor 10, a division of current will be realized at junction 58. The portion of this current passing from line 60 through the collector electrode 42c and emitter electrode 42e of $Q_1$, and the emitter interconnecting line 62 will vary in response to the gating voltage at base electrode 42b. As the light impinging upon photoconductor 10 diminishes, the current passing as above described through lines 60 and 62 will proportionately increase. This will result in the passage of a correspondingly diminished current along line 64. The current present in line 64 is passed through a calibrating resistor 66 and double-pole single-throw switch $S_1$ having contacts 67a and 67b to charge a capacitor C through a timing resistor 68.

The above-referenced shutter arrangement contemplated for the instant example is of the variety wherein exposure is initiated by the actuation of a shutter opening blade. During the exposure interval, a second or closing shutter blade is retained in a retractive position by an electromagnet. A variation of a voltage sensitive Schmitt trigger circuit functions to maintain the electromagnet in an energized state only throughout an exposure interval established by the energization of an R-C circuit. A schematic representation for such a shutter-lens arrangement is illustrated next to the exposure timing function of FIG. 1. In this portion of the drawing, an opening blade 91a is initially positioned so as to block the input of light through its aperture 92a. When released by a manually actuated, spring biased latch 93 which holds blade 91a at the latch pin 94, blade 91a will move under the bias of spring 95a into position alining aperture 92a with the lens axis A–A. This position is indicated in phantom. Inasmuch as a closing blade 91b has an aperture 92b in similar axial alinement, a scene will be focused from the lens of the camera onto a portion of photosensitive film. Following the exposure interval an electromagnet having a solenoid as at 82 will cut off and closing blade 91b will move to a position blocking the aperture along axis A–A under the impetus of a spring as at 95b. This alternate positioning of blade 91b is indicated in phantom.

Complementary mechanisms associated with this mechanism include a switch as at $S_6$ which serves to energize the entire exposure control circuitry for a normally closed switch $S_2$ and serves to energize the timing circuit at the instant that blade 91a is opened. To reset the blades 91a and 91b, a reset lever arrangement is pictured as including a reset lever 96 which functions, when actuated, to pull blade 91a into position and to similarly urge blade 91b into blocking position through a reset bar 97. A manual actuator as at 98 functions to manipulate lever 96. A detailed description of the operation of this form of shutter will be found in a U.S. patent to Topaz, U.S. Pat. Ser. No. 3,326,103 entitled: "Auxiliary Shutter Timing Mechanism" and assigned to the common assignee.

Returning to the drawing, the trigger circuit generally indicated at 70 has a normally not-conducting stage which includes a transistor $Q_5$ having base, collector and emitter electrodes 72b, 72c, and 72e, respectively. Collector electrode 72c of $Q_5$ is connected to line 74 of the shutter power source by variable bias resistor 76 and emitter electrode 72e of $Q_5$ is connected to line 52 by variable bias resistor 78. The normally conducting stage of circuit 70 includes transistor $Q_6$ having base, collector and emitter electrodes respectively at 80b, 80c, and 80e. Collector electrode 80c is connected to line 74 through solenoid 82 so that the latter is energized when $Q_6$ conducts. Base electrode 80b of $Q_6$ is connected to collector electrode 72c of $Q_5$ through lead 84, and emitter electrode 80e of $Q_6$ is connected through bias resistor 78 to line 52. With this arrangement, there is essentially a common emitter resistor 78, the adjustment of which establishes a trigger voltage for circuit 70. While the two stages of circuit 70 have been characterized as "normally conducting" and "normally not-conducting", it should be understood that this characteristic is applicable only when a voltage is present across lines 74 and 52.

Upon energization of the exposure timing circuit, the opening blade of the shutter is released to an exposing attitude and solenoid 82 of an electromagnet is energized to hold a shutter closing blade in an open position. During this period $Q_6$ is conducting, the base electrode 80b thereof having been gated from resistor 76 and lead 84. $Q_6$ continues to conduct, thereby permitting the continued energization of the solenoid 82, until the base electrode 72b of transistor $Q_5$ receives a triggering voltage. As $Q_5$ is triggered into conduction, the voltage at base 80b falls below its trigger level and solenoid 82 ceases to be energized. At that time, the shutter closing blade is released and, as a consequence, the exposure interval is terminated.

Returning to the R-C timing circuit, it will be seen that base electrode 72b receives its triggering voltage by virtue of the discharge of capacitor C. As has been earlier described, the interval required to charge capacitor C to such trigger voltage, in turn, is determined by the light-responsive current passing through resistor 68. A shunt 86 including switch $S_2$ is positioned in the system for purposes of activating the timing network.

It will be apparent that the exposure timing system will respond to whatever current is imposed across its R-C circuitry. Accordingly, through appropriate switching, that circuit will similarly react to a photometric output derived for flash or artificial illumination. This alternate operating mode is now described.

Turning to the mode selection function, a double-pole double-throw switch $S_3$ adjusts the light-sensing function to measurement under ambient illumination as described above when closed to connect terminals 90a with 90b. For photometric measurement under a flash mode, switch $S_3$ is closed so as to connect terminals 90a with 90c. The interconnection provided by this switching position serves to reverse the interrelationships respectively of photoconductors 10 to 16 and resistors 24 to 30 within each light-sensing branch. In effect, the position of the photoconductor in each branch is exchanged with its corresponding resistor. A conventional "on-off" switch for the entire circuitry is indicated at $S_1$0. The actuation of switch $S_6$ occurs at the schematically depicted shutter mechanism.

Assuming that switch $S_3$ is now positioned for flash mode exposure, and that photoconductor 10 is receiving more light than photoconductors 12 through 16, a voltage will be present at junction 34 which increases as the intensity of light increases. Inasmuch as photoconductors 12 through 16 are not reacting to light of such intensity, the voltage levels at their respective branch junctions 36 through 40 will be lower than that developed at junction 34. When the branch junction voltages are imposed upon the appropriate base electrodes of the output selection circuit transistors, $Q_1$ will conduct and the remaining transistors $Q_2$, $Q_3$, and $Q_4$ will be back biased into nonconduction. Since it reacts to select the branch output potential of highest intensity, the function of the output selection circuit for the instant mode is identical with that for the ambient lighting mode.

To derive a current flow appropriately responsive to the selected light-sensing branch output at transistor $Q_1$, a switch $S_4$ is inserted into the exposure timing function. When switch $S_4$ is closed and double-pole switch $S_1$ is closed against terminal 67b, resistor 54 is essentially bypassed and the current utilized for R-C current timing is that passing lead 60 and emitter interconnective line 62. In comparison, this current was divided at junction 58 during ambient illumination mode operation. From lines 62 and 63, the signal current passes through terminal 67b of switch $S_1$ and into the timing resistor 68. The exposure timing circuit will function as above described in response to this current. To improve performance, a switch $S_5$ may be opened during the flash mode of operation for the purpose of inserting a resistance 92 into line 62 in addition to that at 56. An insertion of such added resistance may be of value in improving the switching performance of the transistor bank $Q_1$ to $Q_2$.

The light-sensing function of the invention may be combined with a variety of output selection functions. To illustrate this flexibility, FIG. 2 depicts an embodiment of the same light-sensing function coupled with an output selection function formed of complementary amplifiers. Turning to the drawing, the light-sensing function is shown comprising a grouping 100 of four photoconductors or light dependent resistors 102, 104, 106, and 108 alined for metering various light intensities within the field of a camera. Each of these photoconductors forms a first leg of a light-sensing branch whose second leg respectively is formed incorporating a resistor as at 110, 112, 114, and 116. The branches are shown connected across a battery power source 118 from leads 120 and 122. For illustrative convenience, the light-sensing arrangement of the embodiment is shown designed for ambient mode light measurements. However, it will be understood that by providing suitable switching and voltage taps, a flash mode of operation will be available. In further simplification, the output of the selective light-sensing network will be taken as an analog signal voltage varying proportionately with measured light intensity.

As in the earlier illustration, fixed resistors 110 through 116 preferably are selected such that each has a value of resistance of an order of magnitude comparable to that of the photoconductors at medium light intensities. Similarly, a voltage dividing arrangement for each light-sensing branch is effected respectively at junctions 124, 126, 128, and 130. The voltages present at each of these junctions is impressed, respectively, upon the base electrodes 132$b$, 134$b$, 136$b$, and 138$b$ of a bank of PNP transistors $Q_{10}$, $Q_{11}$, $Q_{12}$, and $Q_{13}$. The collectors 132$c$, 134$c$, 136$c$ and 138$c$ of these transistors are connected respectively to the base electrodes 142$b$, 144$b$, 146$b$, and 148$b$ of complementary NPN transistors $Q_{14}$, $Q_{15}$, $Q_{16}$, and $Q_{17}$. Similarly, the emitter electrodes 132$e$, 134$e$, 136$e$, and 138$e$ are coupled respectively with the corresponding collector electrodes 142$c$, 144$c$, 146$c$, and 148$c$.

Those versed in the art at hand will recognize that each of the thus coupled transistor pairs as at $Q_{10}$ through $Q_{14}$, for descriptive purposes, will react similarly to a singular PNP transistor. With the coupled arrangement shown, however, a higher circuit performance is available. A more detailed description of the operation of such complementary transistor pairs may be found in a publication by T. Hemingway entitled "Electronic Designer's Handbook," pp. 177—190, 1966. Similar to the arrangement of FIG. 1, all the collector electrodes of transistors $Q_{14}$ through $Q_{17}$ are interconnected by leads 150 and all emitter electrodes 142$e$, 144$e$, 146$e$, and 148$e$ are interconnected along line 152. The functioning of the one selected coupled transistor pair is such as to limit the current passing from source 118 through line 152, resistor 156 and line 154. This metered current will increase with diminishing light intensity at the selected photoconductor. A signal voltage output for the circuit as shown positioned across the transistor bank at $E_o$ will diminish with a corresponding diminution of such light intensity. More specifically, the voltage output $E_o$ across terminals 158 and 160 will be present as the difference between the potential at battery source 118 $E_{118}$, minus the voltage drop across resistor 156, $E_{156}$; i.e., $E_o = E_{118} - E_{156}$. The complementary PNP-NPN transistor pairs shown in the FIG. are used in that arrangement of species inasmuch as the polar sense of source 118 is reversed with respect to that of the source shown and described in connection with FIG. 1. An alternate arrangement for the complementary pairs utilizing a source of reversed polarity would be inserted as an NPN-PNP sequence.

A circuit constructed as illustrated in FIG. 2 but substituting three fixed and one variable resistor for photoconductors 102 to 108 has been observed to provide the following outputs $E_o$ with respect to the settings of the variable resistor:

| Variable resistor (megohms) | Output (volts) |
|---|---|
| 0 | 8.8 |
| 1 | 8.8 |
| 1.5 | 8.4 |
| 4.7 | 8.0 |
| 5.6 | 7.8 |
| 12.0 | 5.8 |
| 22 | 4.5 |
| $\alpha$ | 1.6 |

Note from the tabulation that the output is substantially uneffected by the variable resistor until its value exceeds 4 megohms which corresponds to a dimly illuminated photocell. Should a voltage output responsive to flash illumination be desired, it may be derived across resistor 156. Of course, mode selection switching would be necessitated as described in connection with FIG. 1.

Figure 3:
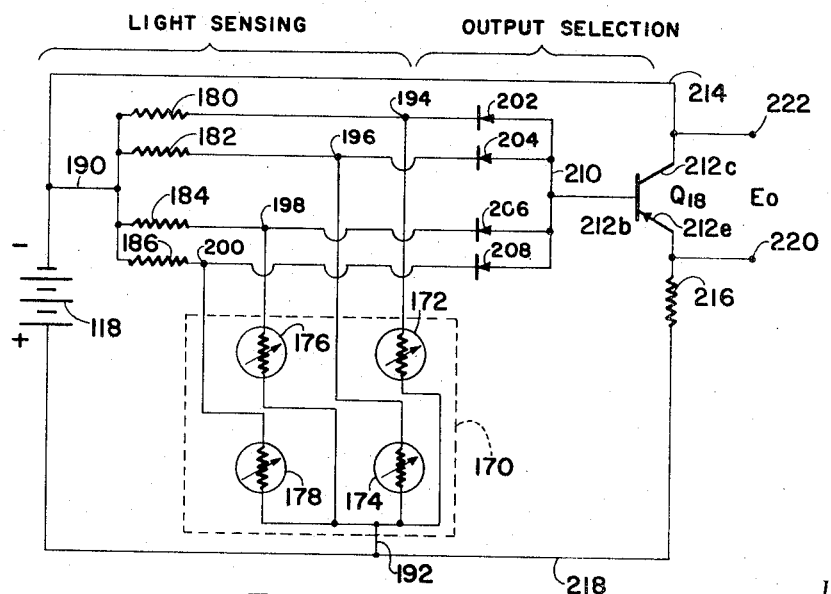
FIG. 3 is a second alternate embodiment of the light-sensing and signal selecting function of the exposure control system according to the invention.

Another embodiment for the light-sensing and output selection functions of the invention is illustrated in FIG. 3. As in the embodiments described above, the light-sensing function comprises a grouping 170 of four photoconductors 172, 174, 176, and 178. Each of the photoconductors forms a leg of a light-sensing branch whose second leg is formed incorporating a resistor respectively at 180, 182, 184, and 186. The branches are shown in connection across a battery power source 188 from leads 190 and 192. For illustrative convenience, the light-sensing function of the embodiment is shown arranged for ambient mode light measurements. However, it should be understood that by providing suitable switching and voltage taps, a flash mode of operation may be realized. Similar to the last described embodiment, the output of the selected light-sensing branch is taken as an analog signal voltage varying proportionately with measured light intensity. In the same regard, each light-sensing branch functions as before described to derive light-responsive voltages at voltage dividing junctions shown respectively at 194, 196, 198, and 200. The voltage present at each of these junctions is impressed, respectively, upon the cathodes of unilaterally conductive diodes 202, 204, 206, and 208. Note again that the polar sense of voltage source 118 is reversed in comparison with that described in connection with FIG. 1. The diode anodes are mutually interconnected along line 210. Accordingly, that diode connected with the branch junction having a potential of maximum value will be forward biased into conduction and thereby serve to back-bias the remaining diodes. As a result, the remaining diodes will be nonconductive and, consequently, isolated from the circuit. The thusly selected light-responsive signal voltage is introduced to the base electrode 212$b$ of PNP transistor $Q_{18}$ having a collector electrode 212$c$ and emitter electrode 212$e$ drop across resistor 216.

The present system evolves a unique coordination of analog sensing for light intensity with a form of sensing logic. This functional interrelationship permits the system to be adapted to use with a variety of exposure control systems. A characteristic of the light-sensing and selection arrangement which may be noted throughout all embodiments of the system resides in the selection of a branch junction output of highest, predominant or extreme potential. This characteristic is present whether the photoconductor receiving maximum or minimum photic stimulation is selected. Further, it should be understood that the term "highest" highest"as used above is meant to encompass voltage signals derived from alternate polarities. The alternate embodiments described hereinabove are representative of this advantageous design flexibility. Specifically in this regard, it will be apparent that the number of light-sensing branches within the photometering network may be increased or decreased to suit operational needs.

Since certain changes may be made in the above system and apparatus without departing from the scope of the invention, it is intended that all matter contained in the above description or shown in the accompanying drawings shall be interpreted as illustrative and not in a limiting sense.

I claim:

1. An exposure control system for photographic apparatus comprising:
    a light-sensing network including a plurality of branches connected in parallel with a source of potential for photometrically evaluating select portions of a scene;
    each said branch being formed having at least one photoconductive element and resistor means arranged in series relationship for providing at the junction therebetween a variable potential output dependent upon the intensity of illumination of said element;
    discrete current amplification means having abrupt cutoff characteristics coupled with each said branch output and interconnected to form a selector circuit adapted to operatively isolate all but that said discrete amplification means which receives the said output of predominant potential; and
    means responsive to said selector circuit output for photographically exposing photosensitive materials in correspondence with the exposure value represented by said selected output.

2. The exposure control system of claim 1 in which said light-sensing network is connected with said source of potential in a manner wherein said variable potential output increases as the intensity of illumination of said at least one photoconductive element decreases.

3. The exposure control system of claim 1 in which said light-sensing network is connected with said source of potential in a manner wherein said variable potential output increases as the intensity of illumination of said at least one photoconductive element increases.

4. The exposure control system of claim 1 including switching means for selectively altering the polarity of the connection of said source of potential with said light sensing network.

5. The exposure control system of claim 1 in which:
the resistance value of each said photoconductive element varies inversely with the magnitude of said intensity of illumination; and
said sensing network is connected with said source of potential in a manner wherein said variable potential output increases as the resistance of said element decreases.

6. The exposure control system of claim 1 in which:
the resistance value of each said photoconductive element varies inversely with the magnitude of said intensity of illumination; and
said light-sensing network is connected with said source of potential in a manner wherein said variable potential output increases as the resistance of said element increases.

7. The exposure control system of claim 1 wherein each said current amplification means is operative to conduct in response to the magnitude of said connected variable potential output; and said current amplification means are mutually interconnected in a manner wherein that coupled with the said branch output potential of predominant magnitude is forward biased and serves to back bias the remaining current amplification means.

8. The exposure control system of claim 1 wherein each said current amplification means comprises transistor means adapted to be rendered conductive in correspondence with the magnitude of said coupled variable potential output.

9. The exposure control system of claim 1 wherein said resistor means is selected having a value of resistance near to that of said photoconductive element when the element is stimulated by light of medium intensity.

10. The exposure control system of claim 1 wherein:
the values of resistance of said resistor means within each said light-sensing branch are substantially equal: equal; and said values of resistance are selected having a magnitude near the resistance value of one said photoconductive element when the element is stimulated by light of medium intensity.

11. The exposure control system of claim 1 wherein:
said resistor means is selected having a value of resistance near to that of said photoconductive element when the element is stimulated by light of medium intensity; and
each said current amplification means is operative to conduct in response to the magnitude of the said connected variable potential output.

12. The exposure control system of claim 1 in which:
said resistor means is selected having a value of resistance near to that of said photoconductive element when the element is stimulated by light of medium intensity;
each said current amplification means is operative to conduct in response to the magnitude of said connected variable potential output; and
said current amplification means are mutually interconnected in a manner wherein that coupled with the said branch output potential of predominant magnitude is forward biased and serves to back remaining current amplification means.

13. The exposure control system of claim 1 wherein:
said resistor means is selected having a value of resistance near to that of said photoconductive element when the element is stimulated by light of medium intensity;
said current amplification means is operable to conduct in response to the magnitude of said connected variable potential output;
said selector circuit is adapted to interconnect said branches in a manner permitting the forward biasing only of that current amplification means responding to the branch potential output of highest intensity; and
including switch means for selectively altering the polarity of the connection of said source of potential with said light-sensing network.

14. The exposure control system of claim 1 in which:
said resistor means is selected having a value of resistance near to that of said photoconductive element when the element is stimulated by light of medium intensity;
each said current amplification means comprises transistor means coupled for conductive response with said light-sensing branch potential output; and
wherein said transistor means of said plurality of branches are mutually interconnected so as to permit the forward biasing only of that transistor means responding to the branch potential output of maximum intensity.

15. The exposure control system of claim 1 wherein each said current amplification means comprises transistor means coupled for conductive response with said light-sensing branch potential output; and wherein said transistor means at said plurality of branches are mutually interconnected so as to permit the forward biasing only of that transistor means responding to the branch potential output of highest intensity.

16. The exposure control system of claim 15 wherein said transistor means are formed as complementary transistor pairs.